(12) United States Patent
Andersen

(10) Patent No.: US 6,274,004 B1
(45) Date of Patent: Aug. 14, 2001

(54) WATER PURIFICATION DEVICE

(75) Inventor: Peter Andersen, Sandnes (NO)

(73) Assignee: Pure Water Tech Ltd. AS, Vigrestad (NO)

( * ) Notice: Subject to any disclaimer, the term of this patent is extended or adjusted under 35 U.S.C. 154(b) by 0 days.

(21) Appl. No.: 09/355,632

(22) PCT Filed: Feb. 4, 1998

(86) PCT No.: PCT/NO98/00039

§ 371 Date: Aug. 2, 1999

§ 102(e) Date: Aug. 2, 1999

(87) PCT Pub. No.: WO98/33744

PCT Pub. Date: Aug. 6, 1998

(30) Foreign Application Priority Data

Feb. 4, 1997 (NO) .................................................. 970504

(51) Int. Cl.[7] .............................. B01D 3/02; B01D 3/42; C02F 1/14
(52) U.S. Cl. .................. 202/234; 159/903; 159/DIG. 21; 202/181; 202/185.3; 203/1; 203/10; 203/100; 203/DIG. 1; 203/DIG. 17
(58) Field of Search .................................. 203/10, 11, 1, 203/86, 100, DIG. 17, DIG. 20, DIG. 1; 159/903, DIG. 39, DIG. 40, 901, DIG. 21, DIG. 15; 202/234, 185.3, 181, 267.1

(56) References Cited

U.S. PATENT DOCUMENTS

| | | | |
|---|---|---|---|
| 3,986,936 | * 10/1976 | Rush | 202/234 |
| 4,053,368 | * 10/1977 | Courvoisier et al. | 203/10 |
| 4,187,151 | 2/1980 | Hanning . | |
| 4,313,426 | * 2/1982 | Niedermeyer | 126/438 |
| 4,452,696 | 6/1984 | Lopez . | |
| 4,770,775 | 9/1988 | Lopez . | |
| 4,966,655 | * 10/1990 | Wilkerson, Jr. | 202/234 |
| 5,316,626 | 5/1994 | Guy . | |
| 5,421,962 | 6/1995 | Shvarts et al. . | |
| 5,468,351 | * 11/1995 | Hirota et al. | 159/903 |
| 6,001,222 | * 12/1999 | Klein | 202/234 |

FOREIGN PATENT DOCUMENTS

| | | | |
|---|---|---|---|
| 2503251 | 7/1976 | (DE) . | |
| 2650482 | 5/1978 | (DE) . | |
| 3501396 | 7/1986 | (DE) . | |
| 4406365 | 8/1995 | (DE) . | |
| 0345236 | 12/1989 | (EP) . | |
| 291093 | * 12/1986 | (JP) . | |
| 62-213891 | * 9/1987 | (JP) | 203/DIG. 1 |
| 9104228 | 4/1991 | (WO) . | |

OTHER PUBLICATIONS

Shichiji, "Apparatus for Desalting Sea Water", Jun. 20, 1985.

* cited by examiner

*Primary Examiner*—Virginia Manoharan
(74) *Attorney, Agent, or Firm*—Browdy and Neimark

(57) ABSTRACT

A water purification and/or desalination plant for producing drinking water from a polluted water source or sea water with the aid of sunlight, which plant includes an evaporator (1) having a roof part (2) made of a light-penetrable material, and an underlying basin part (3) containing the water that is to be purified, which basin part (3) includes channels (17) for collecting water vapor that has been condensed on the inside of the roof part (2), and a reservoir (10) for purified water. The plant also includes a device for removing moist air or vapor from the evaporator and a device for condensation of the moist air or vapor outside the evaporator.

7 Claims, 4 Drawing Sheets

WATER PURIFICATION DEVICE

CROSS REFERENCE TO RELATED APPLICATION

The present application is the national stage under 35 U.S.C. 371 of PCT/NO98/00039, filed Feb. 4, 1998.

FIELD OF THE INVENTION

The present invention relates to a water purification and/or desalination plant for producing water from a polluted water source or sea water with the aid of sunlight, which plant includes an evaporator having a roof part consisting of a light-penetrable material, and an underlying basin part containing the water that is to be purified, which basin part includes means for collecting water vapor that has been condensed on the inside of the roof part, and a reservoir for purified water.

BACKGROUND OF THE INVENTION

In large parts of the world the fresh water resources are limited and drinking water therefore has to be produced from brackish water or sea water. The most common water purification plants are evaporation/condensation processes in which the requisite energy is produced by burning cheap natural gas (in the Gulf region) or more commonly, by harnessing solar energy. In many regions there is a great need for simple, efficient and low-cost equipment for the desalination of sea water.

A number of such plants and devices for desalination and purification of drinking water which employ solar energy are previously known.

DE 2503251 makes known a device for producing drinking water from polluted or saline water with the aid of solar energy. This evaporator consists of a basin with a roof in the form of an inverted V, which can be penetrated by solar energy. In the lower end of the inclined roof there is a run-off channel which receives water that has condensed on the inside of the roof.

DE 3501396 A describes a similar device having a basin and a glass roof in the form of an inverted V. In the lower end of the roof there is a collecting channel for water which has condensed on the inside of the roof.

DE 2650482 describes a device consisting of a basin and a sloping glass roof, wherein the glass roof is cooled in order to enhance the condensation.

International Patent Application WO 91/04228 makes known a method and device for producing drinking water from polluted water with the aid of solar energy, consisting of a construction having a plurality of chambers or sections, of which one chamber or section is an evaporation chamber and a second section is a condensation chamber. Swedish Published Patent Application 46213 makes known a transportable device for producing fresh water by desalting sea water with the aid of solar energy. The device includes a casing having at least one transparent portion and a collecting channel for fresh water. In the bottom of the device there is provided a solar energy absorber having ducts for cooling the absorber with the aid of a coolant. The coolant flows in a closed circuit and is used to heat the incoming sea water.

U.S. Pat. No. 4,187,151 describes a floating desalination plant. A bottom having a preferably transparent or translucent chamber floats on the surface of the sea. Waves cause the chamber to expand and contract so that air is drawn into the chamber. The moist air exiting the chamber is conducted to a condensation and collecting tank below the sea surface.

There are also known a number of devices which use reverse osmosis for producing fresh water from sea water. As examples of publications which describe this, reference may be made to U.S. Pat. Nos. 4,076,626, 4,452,696 and 4,770,775.

One disadvantage of the known devices is that they are relatively bulky and relatively stringent requirements must be met with respect to periodic maintenance.

Another disadvantage of these known devices is that they are relatively inefficient, since most of the solutions are based on a more or less closed chamber, where the water vapor is condensed on the surface of the chamber.

SUMMARY OF THE INVENTION

One of the objects of the present invention is to provide a plant of the aforementioned type that is so inexpensive, efficient and simple that it can be used in small communities along the coast in sunny developing countries, e.g., along the coast of the south-eastern Mediterranean or the Red Sea.

Another object of the present invention is to provide a plant of the aforementioned type, where its efficiency is substantially improved, compared with other known plants.

Yet another object of the invention is to provide a plant of the said type, where the necessity of inspection and periodic maintenance is minimal.

This is accomplished with a water purification and/or desalination plant for producing drinking water from a polluted water source or sea water with the aid of sunlight, which plant includes an evaporator having a roof part consisting of a light-penetrable material, and an underlying basin part containing the water that is to be purified, which basin part includes means for collecting water vapor that has been condensed on the inside of the roof part, and a reservoir for purified water, which according to the invention is characterized in that the plant also includes means for removing moist air or vapor from the evaporator and means for condensation of the moist air or vapor outside the evaporator.

The means for removing moist air or vapor from the evaporator and condensation thereof preferably include a condenser connected to a fan.

In the basin part there is preferably provided means for increasing the absorption of heat, which means includes a plate-shaped body which is kept at a constant distance from the surface of the water in the basin part with the aid of buoyancy bodies or floats, which plate-shaped body has a dark, heat-absorbent surface and includes a thermal insulation material.

The plate-shaped body preferably has a surface that is smaller than the surface of the basin part, or the plate-shaped body is equipped with holes or slots for the circulation of water from the underside of the plate-shaped body to the upper side thereof.

The evaporator is connected by means of a pump to a supply of water which is to be purified, which pump is connected to level sensors in the basin part of the evaporator unit for controlling the water level in the basin part.

The roof part of the evaporator consists of a light-penetrable material, which material is preferably heat-insulating, and which material is preferably coated with a tear-resistant coating.

The plant preferably includes a solar panel for producing electric power for the fan, the pump and optionally the condenser.

The invention will be described in more detail below with the aid of exemplary embodiments with reference to the attached drawings.

DETAILED DESCRIPTION OF THE INVENTION

Figure 1:
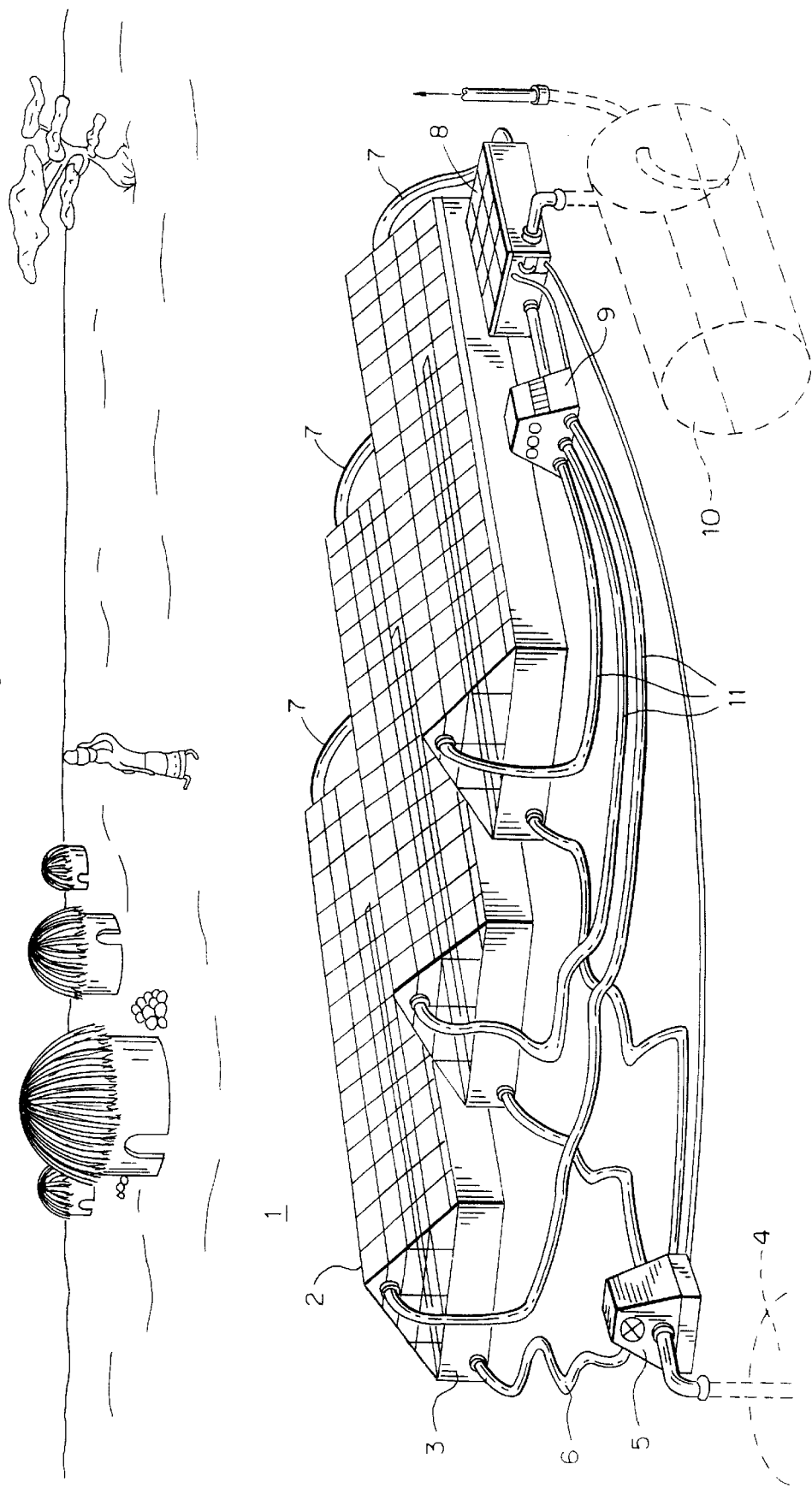
FIG. 1 is a simplified outline of a desalination and water purification plant according to the invention.

FIG. 1 shows a plant for desalination and purification of water. The plant consists of an evaporator unit 1, consisting of a housing with a translucent or transparent roof part 2 and a basin part 3. The roof part 2 may, e.g., consist of so-called channeled sheets, which give good insulation. Optionally, a surface layer of a tear-resistant material may be applied to the roof part 2. The unit 1 is connected to a water supply 4, e.g., groundwater or sea water, which is connected to the evaporator unit 1 via a pump 5 and supply pipes 6. Furthermore, the plant consists of a condenser 8 connected to the evaporator unit 1 via vapor discharge pipes 7, a fan 9 connected to the condenser 8 and a reservoir 10 for purified water connected to the condenser. From the fan 9, supply pipes 11 run back to the evaporator unit 1.

Figure 2:
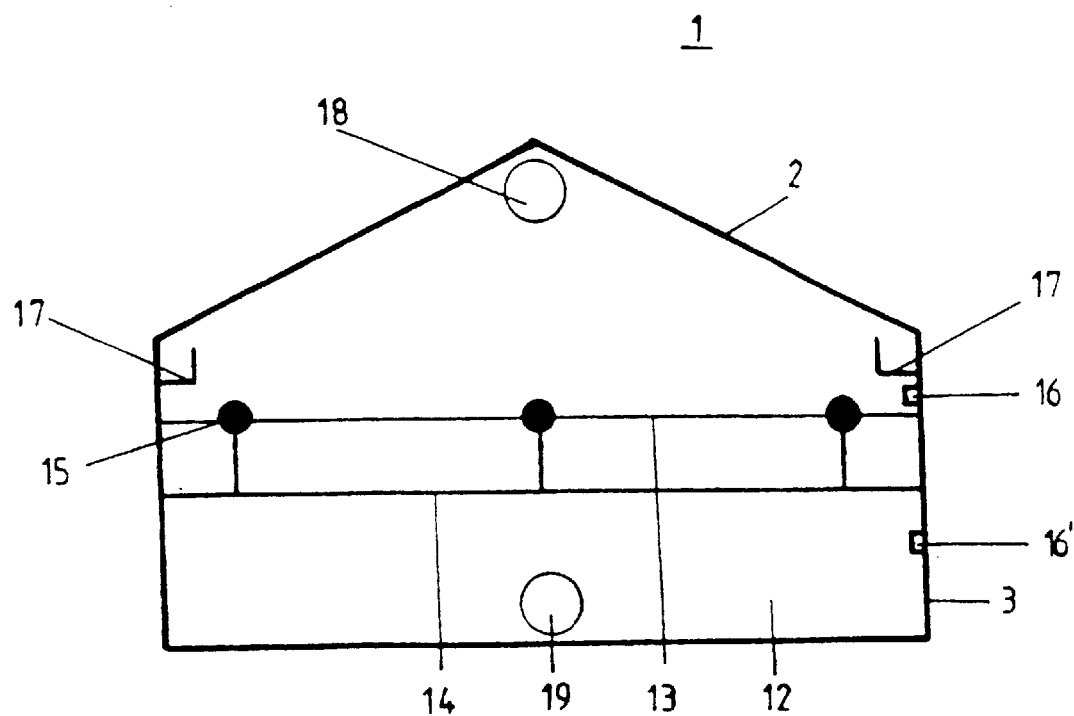
FIG. 2 is a section of the plant according to FIG. 1.

FIG. 2 shows a section through an evaporator unit 1. The evaporator unit 1 consists of a roof part 2 having a sloping or inverted V-shaped profile, a basin part 3, which, e.g., is designed to be rectangular with uptight walls. Water collecting channels 17 are provided in the transition between the roof part 2 and the basin part 3. The bottom of the basin part 3 is filled with water 12. Under the surface 13 of the water there is provided a plate-shaped body 14 which, with the aid of buoyancy bodies or floats 15, is located at a certain distance from the water surface. The purpose of the plate-shaped body 14 will be explained later. Furthermore, the evaporator unit 1 is provided with a vapor outlet 18 and a water inlet 19. To allow control of the water level in the basin part 3 there are provided two level sensors 16 and 16' which are located at respectively the highest and lowest allowed water levels in the basin part.

The plate-shaped body 14 consists of a light and heat absorbent material and is provided with holes or slots which allow water circulation from the underside to the upper side of the body 14. Optionally, the place may be dense and be smaller in size than the basin part 3, so that the water can flow up along the sides of the plate. If the plate 14 is to attain a maximum heat absorption, it may, e.g., be made of black or dark, insulating material. When the sun shines on the evaporator unit 1, the plate-shaped body 14 will absorb heat, and emit this heat into the water which is above the body 14. This water will then have a higher temperature than the water below the body 14. The use of a plate-shaped body 14 of this kind will mean that the evaporation will take place more rapidly than in a similar plant which does not use a plate-shaped light and heat absorbing body. The water above the plate-shaped body 14 will being to evaporate and rise in the space above the surface 13 of the water. When the vapor strikes the roof part 2, some of the water will be condensed and run down along the roof part 2 and be collected in the water collecting channels 17. From the channels 17, the condensed water is led out of the evaporator unit 1. In addition to condensed water, some of the vapor-containing air in the space above the water surface 13 will be led out of the evaporator unit 1. When the water level in the basin part 3 falls below a certain level, the lower level sensor will give a signal to the pump 5 (FIG. 1), which begins to pump untreated water into the basin part 3 until the water level reaches the upper level sensor 16. This sensor 16 will then send a signal to the pump 5, which stops.

Figure 3:
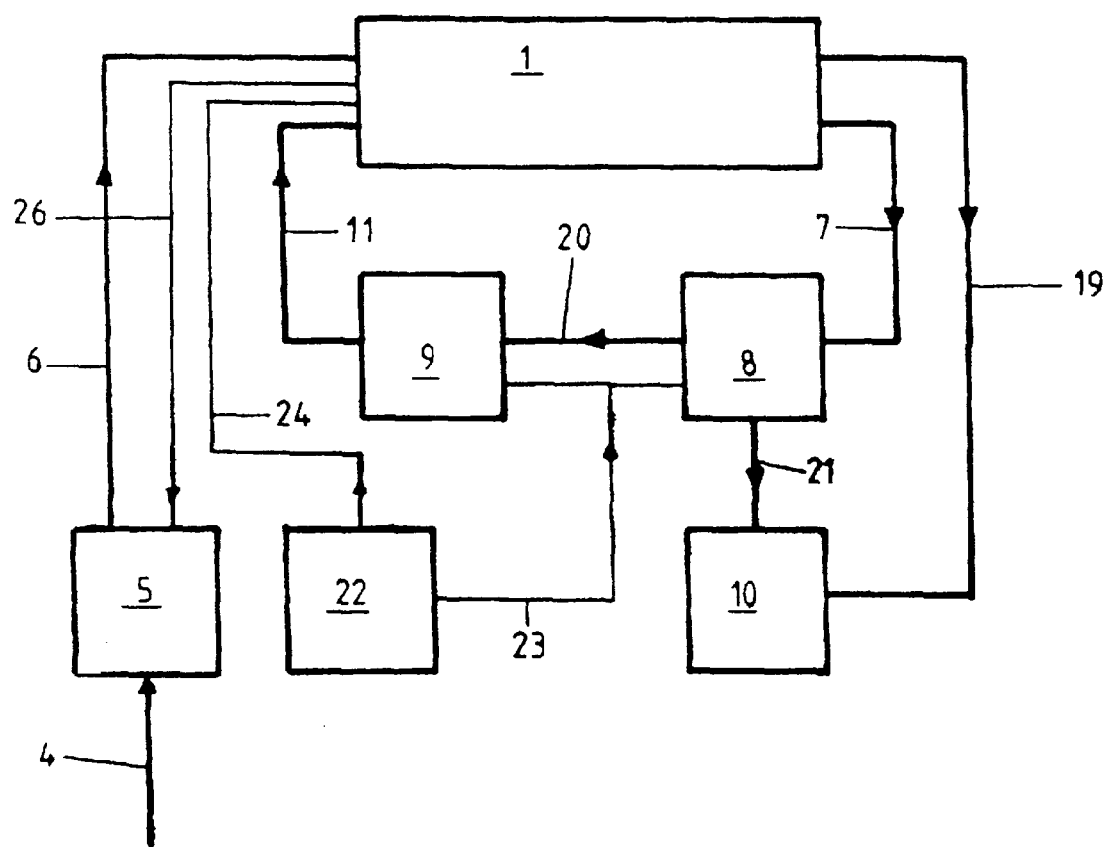
FIG. 3 is a block diagram showing the different units in the plant.

FIG. 3 is a block diagram showing the connection of the various units. The pump 5 is connected to a water source 4, e.g., a groundwater source, sea water or other impure water. The pump 5 is connected to the evaporator unit 1 via a supply pipe 6.

The condensed water collected in the water collecting channels 17 (FIG. 2) is conducted via the pipe 19 directly to the water reservoir 10. This water reservoir 10 may, e.g., be a tank buried in the ground in order to minimise evaporation therefrom.

The moist air or vapor that is collected in the evaporator unit 1, is passed via the pipe 7 to a condenser 8. This task of this condenser 8 is to condense water from the moist air. From the condenser 8, a pipe 21 conducts water to the water reservoir 10, whilst a pipe 20 conducts air from the condenser 8 to a fan 9. The purpose of conducting air back to the evaporator unit 1 is to prevent dust and particles from outside from being collected in the evaporator unit 1, and also that this air, which has been cooled in the condenser 8, will result in a cooling of the roof part 2 (FIG. 2) of the evaporator unit 1 and thereby further improve efficiency. From the fan 9, a pipe 11 conducts air back to the evaporator unit 1.

The fan 9, the pump 5 and the condenser 8 may be operated by means of electricity. If an electricity supply is not available, the energy required can be produced with the aid of a solar panel 22, optionally in combination with rechargeable batteries. The condenser 8 and the fan 9 are connected to the solar panel 22 by an electric conductor 23. The level sensors or switches 16, 16' (FIG. 2) are connected to the solar panel 22 by an electric conductor 24. A electric conductor 26 runs from the level sensors or switches 16, 16' to the pump 5.

The use of a solar cell 22 allows the plant to be fully self-sufficient as regards energy and thus in no need of a connection to other sources of energy.

Figure 4:
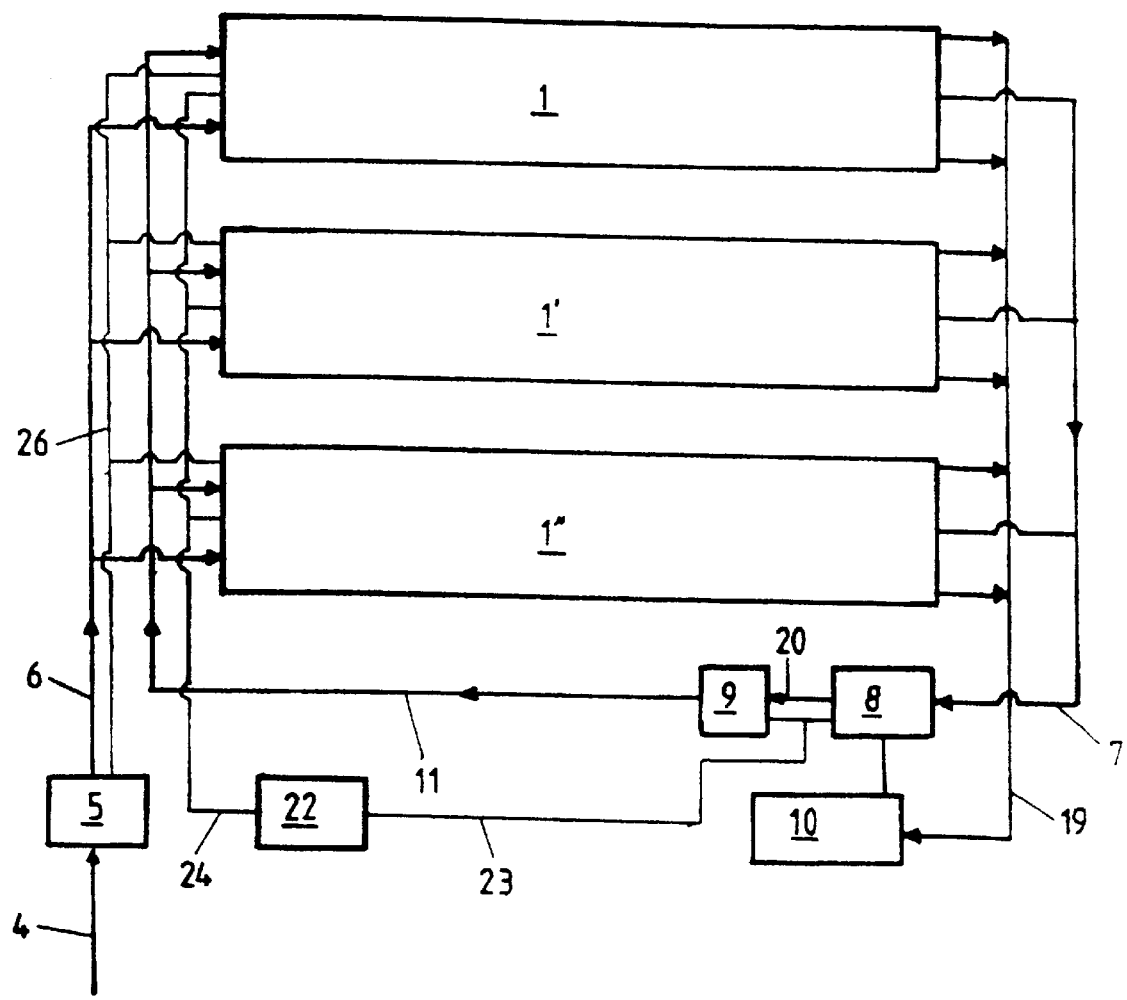
FIG. 4 shows an example of the interconnection of a plurality of desalination and water purification plants.

FIG. 4 shows an embodiment of the plant according to the invention consisting of three evaporator units 1, 1', 1" connected in parallel relation. The arrangement and connection of the evaporator units 1, 1', 1", the pump 5, the fan 9 and the condenser 8 are the same as shown in FIG. 3. In order to be able to selectively control the supply of water from the pump 5 to the individual evaporator units, there must in addition be provided the necessary valve equipment and/or control units (not shown).

Of course, electricity supplies other than a solar panel 22 may be used for operation and regulation of the plant. If the plant, e.g., is in the vicinity of flowing water, a water-operated power turbine could be used to produce the necessary electric power. Optionally, the condenser 8 may be water-cooled instead of operated by electricity.

What is claimed is:

1. A water purification and/or desalination plant for producing drinking water from a polluted water source or sea water with the aid of sunlight comprising:

an evaporator unit (1) having a roof part (2) consisting of a light-penetrable material an underlying basin part (3) containing water (12) that is to be purified;

which basin part (3) includes means (17) for collecting water that has been condensed on the inside of the roof part (2) and a reservoir (10) for purified water unit, means for removing moist air or vapor from the evaporator, and means for condensing the moist air or vapor outside the evaporator unit;

wherein the basin part (3) further includes means for increasing the absorption of heat, said means for increasing the absorption of heat comprising a plate-shaped body (14) and buoyancy bodies or floats (15) which maintain the plate-shaped body a constant distance from a surface (13) of the water (12) in the basin part;

which plate-shaped body has a dark, heat-absorbent surface and includes a thermal insulation material.

2. The water purification and/or desalination plant according to claim 1 wherein the means for removing the moist air or vapor from the evaporator unit include a condenser (8) connected to a fan (9).

3. The water purification and/or desalination plant according to claim 2 wherein the evaporator unit (1) is connected by means of a pump (5) to a supply of water (4) that is to be purified, which pump (5) is connected to level sensors (16, 16') in the basin part (3) of the evaporator unit (1) for regulating the water level in the basin part (3).

4. The water purification and/or desalination plant according to claim 1 wherein the plate-shaped body (14) has a surface smaller than the surface of the basin part (3) and wherein the plate-shaped body (14) is equipped with holes or slots for the circulation of water from an underside of the plate-shaped body to an upper side thereof.

5. The water purification and/or desalination plant according to claim 1 wherein the light-penetrable material of the roof part (2) of the evaporator unit (1) is coated with a tear-resistant coating.

6. The water purification and/or desalination plant according to claim 3 further comprising a solar panel (22) for producing electric power for the fan (9) and the pump (5).

7. The water purification and/or desalination plant according to claim 6 wherein the solar panel produces electrical power for a condenser (8).

* * * * *